No. 633,694. Patented Sept. 26, 1899.
T. HERBST.
DUSTING APPARATUS.
(Application filed June 3, 1899.)
(No Model.)
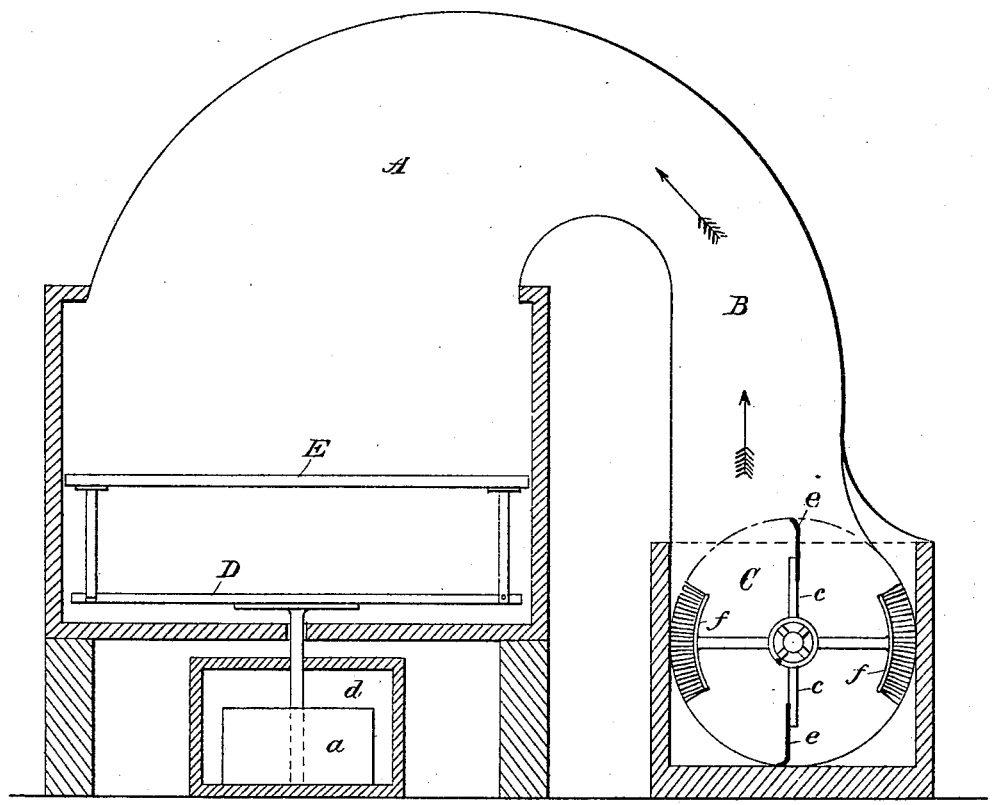
WITNESSES:
INVENTOR
Theodor Herbst,
BY Briesen & Knauth
his ATTORNEYS
THE NORRIS PETERS CO., PHOTO-LITHO., WASHINGTON, D. C.

UNITED STATES PATENT OFFICE.

THEODOR HERBST, OF FRANKFORT-ON-THE-MAIN, GERMANY.

DUSTING APPARATUS.

SPECIFICATION forming part of Letters Patent No. 633,694, dated September 26, 1899.

Original application filed June 2, 1898, Serial No. 682,325. Divided and this application filed June 3, 1899. Serial No. 719,197. (No model.)

*To all whom it may concern:*

Be it known that I, THEODOR HERBST, of Frankfort-on-the-Main, Germany, have invented a certain new and useful Improvement in Dusting Apparatuses Specially Adapted for the Manufacture of Screens for Photoprinting Processes, of which the following is a specification.

My invention relates to dusting apparatuses as above outlined; and it consists in the construction and arrangement hereinafter claimed, the detailed description of one form of my invention, which is shown in the accompanying drawing, forming part hereof, being fully set forth in this specification.

As it is well known, grained glass plates or screens for photoprinting processes have been made either by engraving the same or by etching the same by means of hydrofluoric acid, the latter process being effected by first dusting the plates with asphalt, melting the asphalt, and afterward etching the uncovered parts of the plate by means of the vapor of hydrofluoric acid. Plates or screens produced by the last-mentioned process present a graining which for most photographic purposes is preferable to that of the geometrically-grained screens; but it was not hitherto possible by means of this process to produce plates of greater size than, say, seven and one-half by seven and one-half centimeters, and it was also not possible to produce the etchings with such sharpness as to render the screens fully equal to the geometrically-ruled screens. Now according to the process which I employ, which is fully described in my application for patent, Serial No. 682,325, filed June 2, 1898, of which this application is a division, screens can be made of any desired size and with the desired sharpness. I illustrate and claim herein merely an apparatus for carrying out the dusting process claimed in the said application, as the dusting process is quite important in that a substantial uniform distribution of the dust is effected over the entire surface dusted.

The general operation of the apparatus illustrated in the drawing is as follows: The dusting operation is effected in a closed space in such a manner that only the finest particles of dust are allowed to settle upon the glass plate under treatment. In a closed space a dusting-powder composed of a mixture of asphalt and "dragon's blood" is thrown up into the condition of a whirling cloud by stirring or agitating. The cloud of dust thus produced rises up along a vertical channel or passage connected at top with the dusting-chamber, so that only the very lightest particles pass into this second chamber, on whose bottom is provided a rotating support for the glass plate or screen to be grained and along with which there also rotates a fine-meshed sieve. Upon the plate so treated the dust is melted in the usual manner.

Referring to the drawing, A is the dusting-chamber, which is connected by means of the passage B with the dust-cloud-producing chamber. In the chamber A there is arranged a rotary disk D, serving as a support for the glass plate to be treated. The disk D is mounted on an axle $d$ and is adapted to be rotated by means of clockwork $a$. The sieve E rotates with disk D. The mixture of finely-powdered asphalt and dragon's blood is introduced into the dust-cloud-producing chamber C, wherein the stirring device, comprising revolving arms $c$, with the leather pallets $e$ and brushes $f$, stir the dust and throw it upward. Only the very finest particles pass out of the channel B into the chamber A and passing through the sieve E settle upon the plate carried on the disk D. The plate thus dusted may be further manipulated.

Having described my invention, what I claim, and desire to secure by Letters Patent, is—

1. In an apparatus for dusting the glass plates, the combination of a closed dust-cloud-producing chamber, a closed dusting-chamber having a dust-inlet opening at or near the top thereof connecting the same with the dust-cloud-producing chamber and a rotatable support for the glass plate in the dusting-chamber below the inlet-opening thereof whereby the lighter particles of dust only will pass from the dust-cloud-producing chamber to the dusting-chamber.

2. In an apparatus for dusting the glass plates, the combination of a dusting-chamber, a support for the glass plate which support is rotatable within said chamber, a sieve rotatable within the dusting-chamber above the said support, a dust-cloud-producing chamber, the upper portion of which communicates with the dusting-chamber and a dust-stirring device contained therein whereby only the lighter particles of material will be conveyed from the stirring device to the dusting-chamber, substantially as described.

3. In an apparatus for dusting objects the combination of a dust-cloud-producing chamber, a chamber for receiving the object to be dusted, and a passage connecting the upper ends of the said chambers whereby only the lighter particles of dust will be carried over from the dust-cloud-producing chamber to the receiving-chamber.

4. In an apparatus for dusting the glass plates the combination of a dust-cloud-producing chamber, a dusting-chamber having a dust-inlet opening at the top thereof from the dust-cloud-producing chamber, a support for the glass plate and a sieve above it in the dusting-chamber below the inlet-opening thereof, substantially as described.

THEODOR HERBST.

Witnesses:
 JEAN GRUND,
 RICHARD GUENTHER.